United States Patent [19]

Dorschner

[11] Patent Number: 5,093,747

[45] Date of Patent: Mar. 3, 1992

[54] METHOD FOR PROVIDING BEAM STEERING IN A SUBAPERTURE-ADDRESSED OPTICAL BEAM STEERER

[75] Inventor: Terry A. Dorschner, Newton Centre, Mass.

[73] Assignee: Raytheon Company, Lexington, Mass.

[21] Appl. No.: 662,090

[22] Filed: Feb. 28, 1991

[51] Int. Cl.⁵ .............................................. H01Q 19/06
[52] U.S. Cl. ...................................... 359/316; 359/315
[58] Field of Search ................. 455/611, 615; 350/336, 350/331 R, 356, 357, 347 V; 359/315, 316

[56] References Cited

U.S. PATENT DOCUMENTS

| | | | |
|---|---|---|---|
| 4,639,091 | 1/1987 | Huignard et al. | 350/347 V |
| 4,706,094 | 11/1987 | Kubick | 343/754 |
| 4,882,235 | 11/1989 | Resler | 428/642 |
| 4,937,539 | 6/1990 | Grinberg et al. | 330/4.3 |
| 4,964,701 | 10/1990 | Dorschner et al. | 350/336 |
| 5,018,835 | 5/1991 | Dorschner | 350/336 |

Primary Examiner—Mark Hellner
Attorney, Agent, or Firm—Christopher L. Maginniss; Richard M. Sharkansky

[57] ABSTRACT

A practical means for electrically addressing the extremely large number and high density of phase shifters needed for operation of an optical phased array beam steerer. The array of phase shifters is subdivided into identical subarrays which completely fill an optical aperture. All subarrays are connected electrically in parallel by electrically interconnecting corresponding electrodes of each subarray. Methods are disclosed herein for providing an enhanced number of beam steering positions for the subaperture-addressed beam steerer.

14 Claims, 4 Drawing Sheets

METHOD FOR PROVIDING BEAM STEERING IN A SUBAPERTURE-ADDRESSED OPTICAL BEAM STEERER

BACKGROUND OF THE INVENTION

This invention relates generally to optical beam steering and, more particularly, to a subaperture-addressed optical beam steerer providing high performance optical beam steering of large aperture beams, and methods for providing an enhanced multiplicity of steering angles in such a device.

A static deflector for deflecting a polarized infrared beam is suggested by U.S. Pat. No. 4,639,091, issued Jan. 27, 1987, to J.-P. Huignard et al. The Huignard et al. deflector comprises a layered square plate having as a front layer a window on which stripe electrodes are disposed. Both the window and the stripe electrodes are transparent to an incident infrared beam. A middle layer of the deflector comprises an electro-optical liquid crystal layer. The bottom layer comprises a substrate having a common electrode adjacent the liquid crystal layer. The common electrode is preferably reflective at the beam wavelength, illustratively it is a gold film; alternatively, for a deflector operating by transmission, a transparent rear plate may be used.

Huignard et al. suggest a periodic staircase waveform comprising N voltage steps which are applied to the stripe electrodes, thereby creating local variations of the refractive index in the liquid crystal layer in such a manner as to form a diffraction grating of adjustable period.

Practical applications of the striped-electrode, liquid crystal cell optical beam deflector concept are disclosed in U.S. Pat. No. 4,964,701, "Deflector for an Optical Beam," issued Oct. 23, 1990, to Terry A. Dorschner et al., which patent is incorporated herein by reference, and U.S. Pat. No. 5,018,835, "Deflector for an Optical Beam Using Refractive Means," issued May 23, 1991, Terry A. Dorschner. These, as well as other applications of optical beam steering, underscore the need for rapid, large-angle pointing and scanning of optical beams, in particular, large diameter, diffraction limited carbon dioxide ($CO_2$) laser radar beams. In short, there exists a pressing need for an optical version of the versatile phased array antennas now widely used for microwave radar systems.

An optical phased array "antenna" for electronic steering of optical beams is difficult to realize in practice because of the very large number of phase shifters and the corresponding very high density of electrical connections required for operation of an optical array. High performance, large-angle beam steering requires that the individual phase shifters of the array have spacings less than the wavelength of the light to be steered. Spacings of one-half to one wavelength are usually chosen for microwave phased array antennas, and it is anticipated that comparable spacings will be used in optical systems.

Fabrication of liquid crystal optical phase shifters of this dimension is quite feasible using semiconductor photolithography. At the present time, devices with electrode widths of less than two microns are being readily fabricated. Additionally, sub-micron spacings are feasible with state-of-the-art lithography means. However, connecting each of the phase shifters of a large array to independent voltage supplies appears to be monumental task.

Considering the more-or-less optimal case of one-half wave spacings, if all of the phase shifters of a linear, one-dimensional array were to be independently addressable, the edge connection density would be 2000 per centimeter (cm) of aperture at ten microns wavelength, and 20,000 per cm at one micron wavelength. Since apertures up to one meter are desired, the number of electrical connections required for a conventionally-operated phased array architecture may be one million, or even larger for visible wavelengths. A second one-dimensional unit to cover a second dimension of steering would require an equal number of connections. Numbers of off-chip interconnects of this magnitude are considered to be vastly excessive, especially considering that current practice is to use no more than a few hundred off-chip connects in conventional semiconductor technology.

Optical phased array systems are also known in which the phase shifters and spacings are larger than a wavelength, with consequential performance degradation. The resultant reduction of phase shifters obviously reduces the required number of electrode connections. Nevertheless, this approach is considered unacceptable for many applications since spacings larger than one wavelength generally give rise to multiple output beams for a single input beam. Where the application of the present invention is in a laser radar system, it is generally essential that there be only one beam. The presence of multiple beams may be tolerable for some transmitting functions; the power into the intended beam is merely reduced, albeit by a large factor. However, in the receive mode, simultaneous sensitivity to energy from multiple directions can give rise to an unacceptable ambiguity in the target direction.

SUMMARY OF THE INVENTION

It is therefore a primary object of the present invention to provide an improved method for providing beam steering in an optical beam steerer.

It is a further object of this invention to provide an improved method for providing beam steering in an optical beam steerer which includes a large multiplicity of stripe electrode phase shifters divided among a plurality of identical subarrays, thereby providing higher-resolution steering of large diameter optical beams.

These and other objects of this invention are obtained generally by providing a method for steering an incident electromagnetic beam using a subarray-addressed beam steerer, the beam steerer comprising a multiplicity of phase shifters divided among a plurality of identical subarrays operated in parallel. The method comprises identically subdividing each subarray into a plurality of periods, and applying voltages to the phase shifters of each subarray such that there results a staircase profile of voltages applied to the phase shifters of each period.

In one embodiment, there are an identical number of phase shifters in each period. In a second embodiment, each subarray is subdivided into a number of periods wherein not all of the periods include an equal number of phase shifters In accordance with a preferred embodiment of the present invention, the staircase profile of voltages applied to the phase shifters of each period is selected to provide a phase ramp of $2\pi$ across the period.

In one configuration, the beam steerer comprises an array of optical phase shifters having a common electrode on a first surface thereof, a multiplicity of S parallel stripe electrodes on a second surface thereof, and an electro-optic phase shifting medium intermediate the first and second surfaces. The beam steerer additionally comprises M interconnects, each interconnect being coupled to S/M of the stripe electrodes wherein the ith interconnect is coupled to each of the (i+jM)th stripe electrodes for all integer values of j from 0 to (S/M)−1. The beam steerer further comprises means for coupling M control signals individually between the M interconnects and the common electrode, thereby creating local variations of refractive index in the phase shifting medium.

With this arrangement, it is possible to provide a large number of beam steering positions for a subaperture-addressed beam steerer, in which the subarray size is sufficiently small that the number of electrical connections required is manageable with current technology. By choosing noncommensurate periods or combinations of commensurate and noncommensurate periods, significantly more states can be addressed than with mere factorial divisions of the subarrays.

BRIEF DESCRIPTION OF THE DRAWINGS

The foregoing features of the present invention, and the advantages thereof, may be fully understood from the following detailed description, read in conjunction with the accompanying drawings, wherein.

DESCRIPTION OF THE PREFERRED EMBODIMENTS

The beam steering method of the present invention is disclosed herein with particular regard to an illustrative optical beam steerer. This illustrative beam steerer, providing subaperture addressing of a multiplicity of phase shifters, is disclosed in detail in copending United States patent application, "Optical Beam Steerer Having Subaperture Addressing," filed for Terry A. Dorschner and Daniel P. Resler on the same day as the present application, and assigned to the assignee of the present invention. It is intended to incorporate by reference the teachings of the above-cited patent application into the present application.

Figure 1:
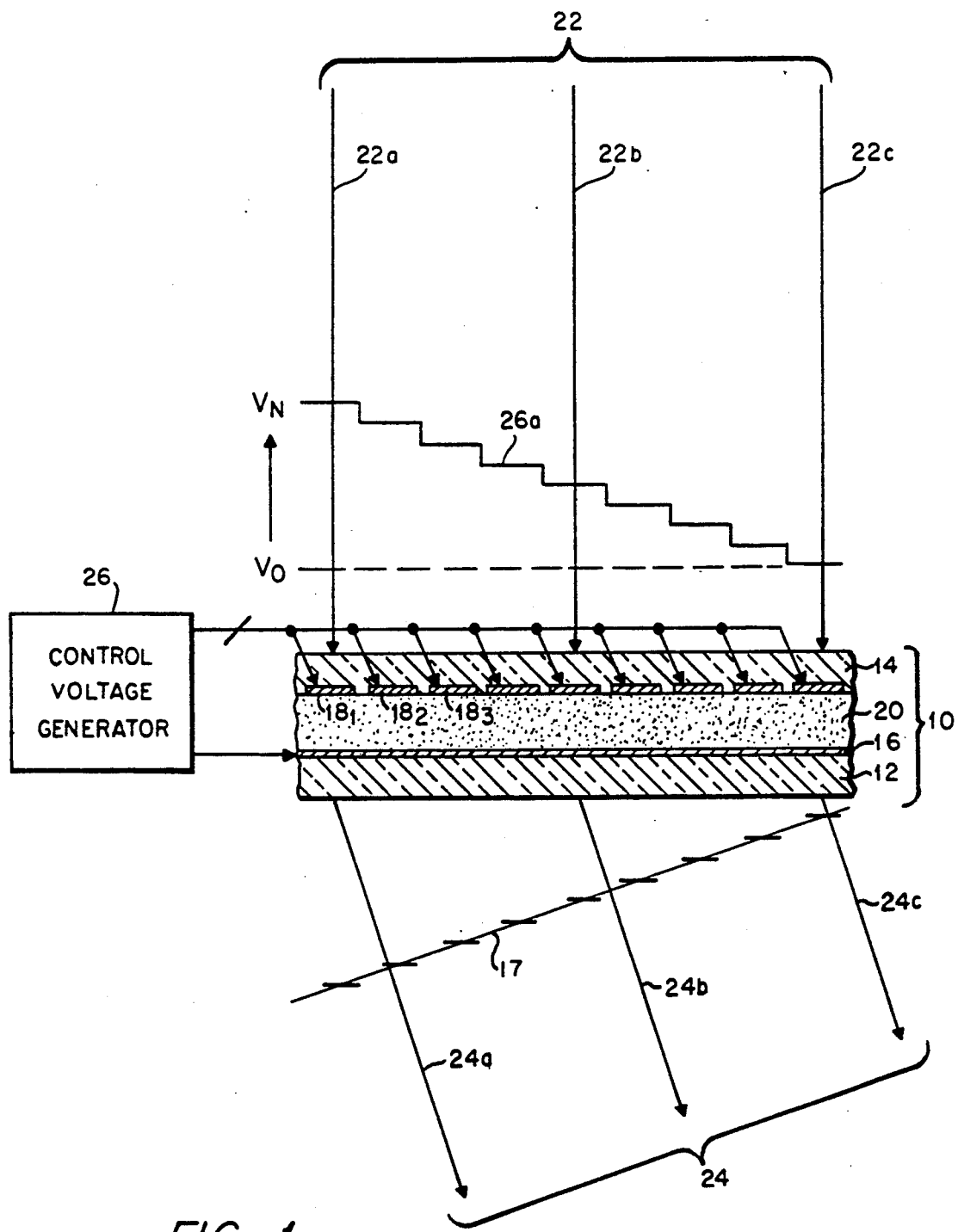
FIG. 1 is a diagrammatical cross-sectional view of a liquid crystal beam deflector.

Referring to FIG. 1, there is shown, in diagrammatical cross-sectional view, a liquid crystal beam steering device 10 of the type described for use in the present invention. Device 10 comprises a liquid crystal cell having windows 12 and 14 which are optically transparent at the frequency range of interest. Common electrode 16, affixed to window 12, is electrically conductive and optically transparent. Electrodes $18_1$, $18_2$, $18_3$ ..., referred to collectively as electrodes 18, affixed to window 14, comprise a plurality of electrically-conductive, optically-transparent stripes. Illustratively, for steering of carbon dioxide laser beams, electrodes 18 may be 4–10 micrometers ($\mu$m) in width, and spaced from one another by approximately one $\mu$m. The space between windows 12 and 14 is filled with a layer of liquid crystal molecules 20, illustratively long, thin, rod-like organic molecules of the so-called "nematic" phase.

The optical beam phase shifter 10 of FIG. 1 is responsive to a light source and beam forming network (not shown) which provide a polarized light beam 22, ranging from visible through far infrared. Light beam 22, represented in part by rays 22a–22c, is directed onto window 14 of optical device 10. Light beam 22 may be incident perpendicular to the plane formed by stripe electrodes 18, or it may be incident obliquely, preferably such that its projection onto the plane formed by stripe electrodes 18 is parallel to the longitudinal direction of electrodes 18.

It is characteristic of liquid crystal molecules whose orientation is well-defined by alignment layers as described above, that the application of an electric field perpendicular to the alignment layer affects the speed of light whose polarization is parallel to the alignment layers propagated therethrough, and hence, the retardance. Thus, in the simplified example of FIG. 1, the application of different potentials between common electrode 16 and the individual stripe electrodes 18 from control voltage generator 26 results in differential electric fields in the regions between the individual stripe electrodes $18_1$, $18_2$, $18_3$, ... and common electrode 16, thereby creating local variations of the refractive index in the liquid crystal layer 20.

In the present simplified example, the potentials applied to the electrodes 18 onto which rays 22a, 22b and 22c are incident, shown diagrammatically as staircase waveform 26a, are such as to cause the greatest retardation to emergent ray 24c, and the least retardation to emergent ray 24a. Thus, the wavefront 17 of the beam 24 which emerges from the optical beam deflector 10 is tilted with respect to the incident wavefront. It is therefore seen that the optical beam deflector 10 of FIG. 1 provides selective beam steering in accordance with the electrical potentials applied to stripe electrodes 18.

The application of control voltage signals to the individual stripe electrodes 18 for the purpose of beam steering is analogous to the methods used in conventional microwave radar beam steering as taught, for example, in *Radar Handbook*, M. I Skolnik, ed., McGraw-Hill, New York, 1970, at chapter 11. As shown by illustrative waveform 26a, a plurality of control voltage signals, being periodic in space and having a continuous progression of voltage steps within each period between a minimum value and a maximum value, may be applied to the multiplicity of stripe electrodes 18. However, it is not intended to limit the present invention only to pluralities of control voltage signals which are periodic.

Operation of the beam steerer is as follows: A staircase of voltage 26a is applied to electrodes 18, the voltage levels chosen to result in a uniform staircase, or an approximation to a ramp, of phase shift across the aperture. Because the response of the liquid crystal is not linear, the voltage ramp does not necessarily comprise equal steps. The phase shifters may be operated modulo $2\pi$, as with microwave arrays, to avoid the requirement of large phase shifts. The resultant "sawtooth" distribution of phase is equivalent to a single continuous phase ramp, which acts like a prism and steers the input beam according to the degree of phase ramp imposed.

Considering now the means for providing control voltages individually to the stripe electrodes 18, the referenced Dorschner et al. application discloses structure for combining the multiplicity of electrodes into a plurality of subarrays, wherein each subarray comprises a number of electrodes sufficient to provide an adequate distribution of beam steering angles for the intended application.

Figure 2A:
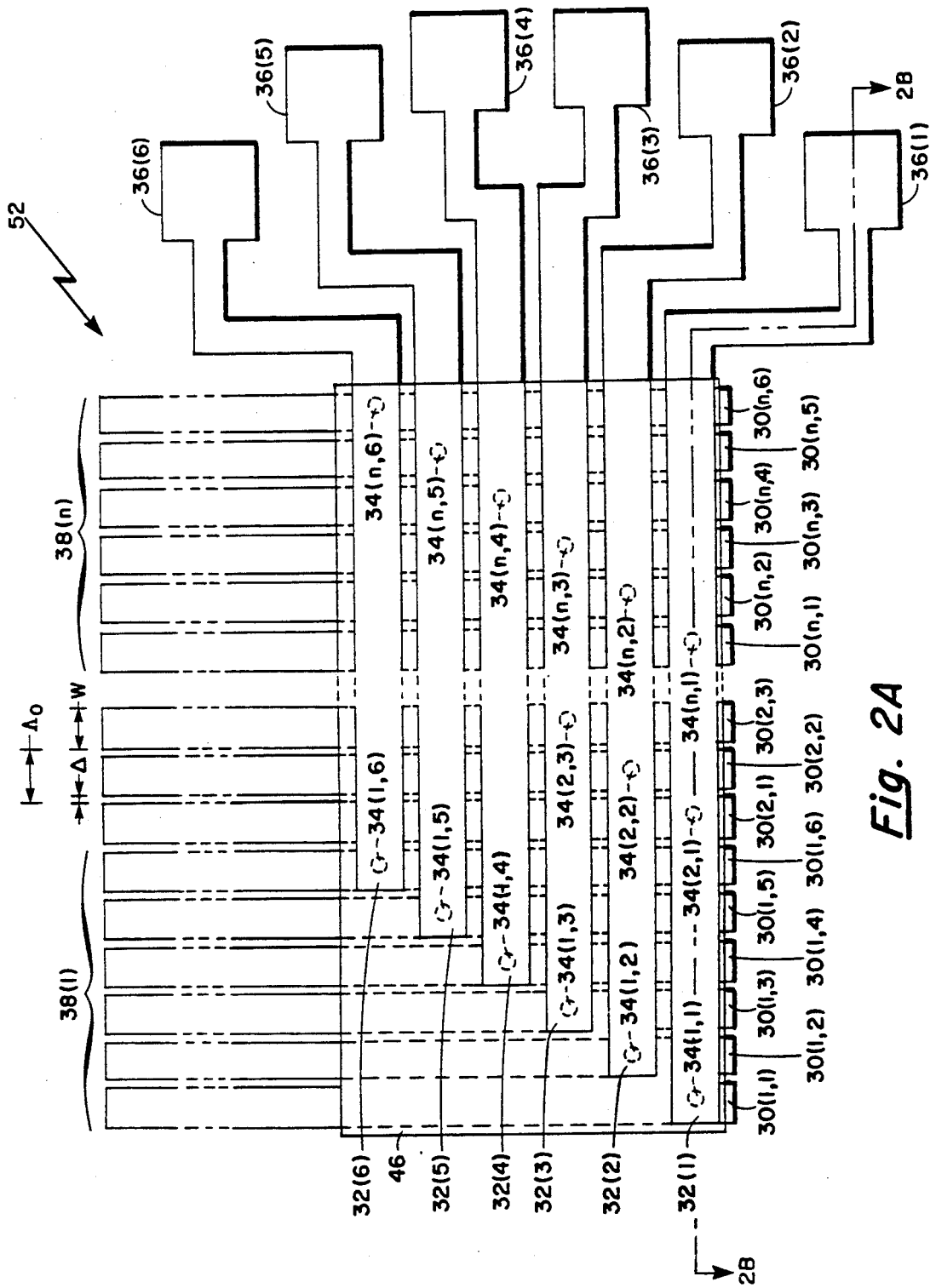
FIG. 2a is a plan view and FIG. 2b is a cross-sectional view of a simplified embodiment of a subaperture-addressed optical steerer according to the present invention.
Figure 2B:
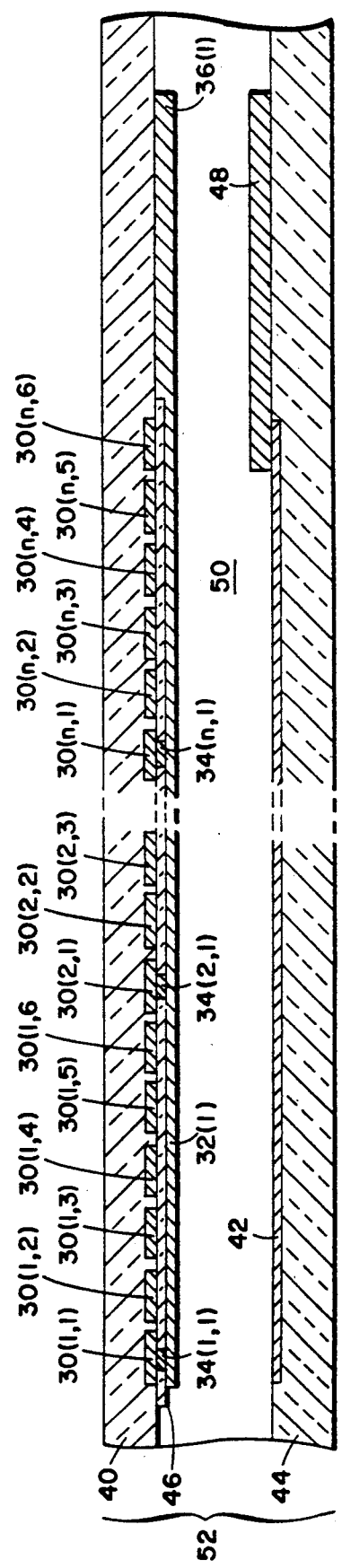

Referring now to FIGS. 2a and 2b, there are shown diagrammatical plan and cross-sectional views, respectively, of a portion of a simplified beam steering assembly according to the principles of the present invention. The assembly includes a liquid crystal cell 52 having windows 40 and 44 and a layer of liquid crystal molecules 50 therebetween. As in the beam steering device 10 of FIG. 1, cell 52 includes a common electrode 42 on an inner surface of window 44, and a multiplicity of stripe electrodes 30(1,1), 30(1,2), . . . , 30(1,6), 30(2,1), . . . , 30(2,6), . . . , 30(n,1), . . . , 30(n,6), referred to collectively as stripe electrodes 30, on an inner surface of window 40.

It is therefore seen that the beam steering assembly of FIGS. 2a and 2b comprises a large array of striped phase shifters, wherein each phase shifter is formed by one of the stripe electrodes 30, the common electrode 42 and the liquid crystal molecules 50 therebetween. The phase shifters have a lateral dimension $\Lambda_0 = w + \Delta$, where w is the width of the stripe electrode 30, and $\Delta$ is the gap between stripe electrodes 30. The phase shifters uniformly cover substantially the entire aperture of the beam steering assembly.

In accordance with the teachings of the Dorschner et al. reference, a plurality of n subarrays 38(1), . . . , 38(n), referred to collectively as subarrays 38, are formed by jumper straps 32(1), 32(2), . . . , 32(6), referred to collectively as jumper straps 32. For ease of illustration, a subarray size of six phase shifters is depicted. Jumper strap 32(1) interconnects stripe electrodes 30(1,1), 30(2,1), . . . , and 30(n,1); jumper strap 32(2) interconnects stripe electrodes 30(1,2), 30(2,2), . . . , and 30(n,2); etc. Jumper strap 32(1) is connected to stripe electrode 30(1,1) by conductor 34(1,1), to stripe electrode 30(2,1) by conductor 34(2,1), . . . , and to stripe electrode 30(n,1) by conductor 34(n,1). In general, it may be said that jumper straps 32(i) are connected to stripe electrodes 30(j,i) by conductors 34(j,i), wherein j runs from 1 to the number of subarrays, n, and i runs from 1 to the number of phase shifters, M, within each subarray. Each jumper strap 32(i) terminates in a contact pad 36(i) for interconnection with external wiring for the purpose of application of control voltages thereto. Similarly, conductor 46 is interconnected with common electrode 42 by conductor 44, and terminates in a contact pad 48 for interconnection with an external lead for the purpose of application of a reference voltage thereto.

In the example depicted in FIGS. 2a and 2b, every sixth electrode 30 is connected in parallel, and there are just six address lines which must be connected via contact pads 36 to external power supplies, instead of the thousands which would ordinarily be required for apertures of one cm or larger. There is also a single ground connection required, independent of the number of electrodes 30 in a subarray 38, or in the entire array.

Although the illustratively six phase shifters of each subarray 38 are independently addressable, each phase shifter is permanently connected in parallel to the corresponding phase shifter of each of the other subarrays 38. Thus, whatever spatial phase distribution is applied to one subarray 38 is repeated across the full aperture.

The subarray-addressed optical beam steerer, disclosed herein and described in detail in the Dorschner et al. reference, may be operated similarly to a conventional phased array, that is, a step-wise approximation to a phase ramp across the beam steering aperture is formed by the application of a corresponding staircase profile of voltages to the electrodes (see FIG. 1). As with conventional phased arrays, the phase ramps may be applied modulo $2\pi$ with maximum amplitude $2\pi$. In the present example, however, only a limited number of ramp periods can be synthesized because only a limited number of phase shifters, namely M, the number in each subarray, are independently addressable. This limits the number of addressable beam positions; however, a rather large number of positions are nevertheless possible, even for moderate subarray sizes, as is discussed below.

Identical ramps with periods $N\Lambda_0$ which are integral factors of the subarray period $M\Lambda_0$ can be applied without any discontinuities at the subarray edges. That is an important consideration for maintaining low levels of sidelobes. Ramps comprised of N phase steps, with N given by $\pm 6$, $\pm 3$, $\pm 2$, and infinity, can be illustratively formed with the subarrays of FIGS. 2a and 2b. Each of these ramp periods corresponds to an addressable beam position given by $\Theta = \sin^{-1}(\lambda/N\Lambda_0)$, where $\lambda$ is the freespace wavelength of the optical beam.

For the case of half-wave spacing, i.e., $\lambda = 2\Lambda_0$, the set of angles obtainable is $\pm 19.47°$, $\pm 41.81°$, $\pm 90°$, and $0°$, respectively. These are large steering angles, which is a consequence of the subarray being very small. The 90° case is actually not of practical utility since very little energy would actually be steered in that direction; the effective radiating area of the device reduces to zero.

Figure 3:
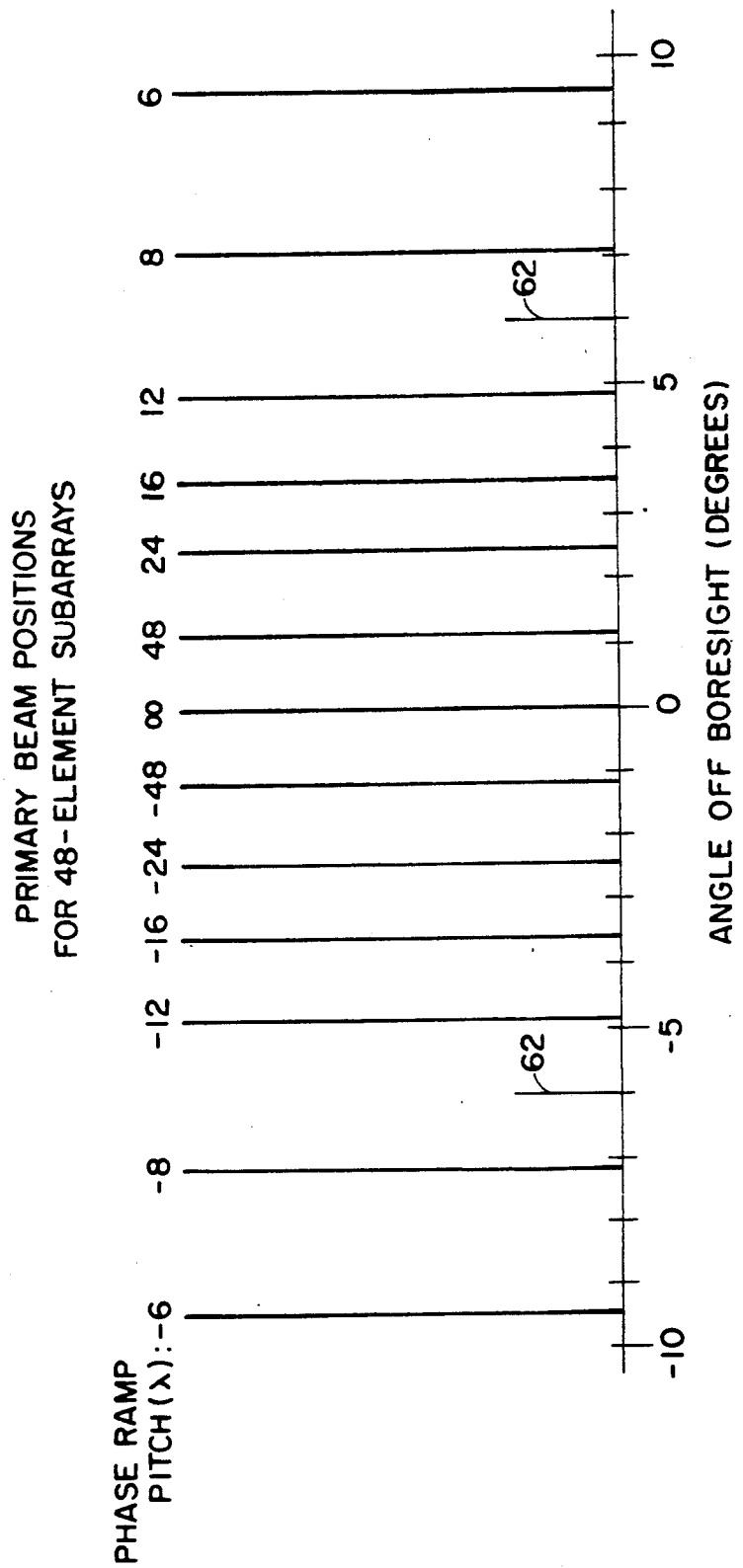
FIG. 3 is a depiction of steering angle vs. phase ramp pitch for an optical beam steerer having 48-element subarrays.

In general, subarrays with larger numbers of phase shifters include smaller steering angles. As an example, subarrays of 48 phase shifters give the distribution of steering angles shown in FIG. 3, for the case of exact factorial periods (labeled "ramp pitch" here). A spacing $\Lambda_0$ of one wavelength between the stripe electrodes of the phase shifters has been assumed. Only those angles subtending a $\pm 10°$ field of regard are shown; that is a fairly typical range of interest. It may be seen from FIG. 3 that the distribution of obtainable angles is fairly uniform and is, in fact, approximately multiples of the smallest steering angles, $\Theta_{min} = \sin^{-1}(\lambda/M\Lambda_0)$. This trend toward uniform angle spacing increases as the number of elements in the subarray increases; the spacing between beams likewise decreases as the number of elements in the subarray increases.

Other driving techniques enable additional beam directions to be addressed. As one example, additional periods can be formed by the linear superposition of the above exact periods. Different and distinct effective periods can also be formed by the combination of periods which sum to the subarray dimension, and thereby give no discontinuities at the subarray edge. For the above six-element subarrays, the only different effective waveform is a two-element ramp followed by a four-element ramp. However, for subarrays having a larger number M of phase shifters, there are many such combinations giving different effective periods. In particular, combinations can be found to provide each possible integral multiple of $2\pi$ phase shifts (whole waves) across the subarray, ranging from unity through M/2, with M being the number of phase shifters in the subarray. This corresponds to M/2 nearly equally spaced, distinct (full Rayleigh spot) beam steering directions on each side of boresight. The quality of these M beams (and others) can be gauged as follows.

Laser radars and other high-performance optical systems require high quality beams having limited aberration and delivering maximal energy on target. Under these conditions a useful figure of merit for beam quality is the so-called Strehl ratio. When aberrations are small, the ratio of the axial intensity I of an aberrated beam to the axial intensity $I_0$ for an unaberrated beam may be expressed by the Strehl ratio as $$I/I_0 = 1 - (2\pi\sigma/\lambda)^2,$$

where $\sigma$ is the root mean square deviation of the wave front from its ideal value. The Strehl ratio is generally considered a useful criterion for beam quality over the range $0.6 < I/I_0 < 1.0$. A Strehl ratio of unity corresponds to an ideal, diffraction-limited beam. A Strehl ratio of 0.6 corresponds to a one-tenth wave rms phase error across the aperture of an optical system. RMS phase errors between one-fourteenth and one-twentieth of a wave are considered to correspond effectively to the classical quarter-wave Rayleigh criterion, and correspond to Strehl ratios of 0.8 and 0.9, respectively. At the Rayleigh criterion, two adjacent, equal-intensity sources have the first dark ring of the diffraction pattern of one point image coincident with the center of the second diffraction pattern, and are said to be just resolvable. The $\lambda/14$ case is also known as the Marechal criterion. Beams satisfying either criterion are in practice considered to be diffraction limited.

Deviations of the phase profile across the aperture of a beam steerer from the preferred linear (sawtooth) profile can be treated as aberrations and the performance quantified by the Strehl ratio. In particular, for steering angles not addressable by identical periods, there may be multiple combinations of periods which will steer to the same angle; however, the phase profile for each such combination deviates from the ideal phase profile, and generally by differing amounts. The Strehl ratio can then be used to select the best combination or distribution for a given steering angle, as well as to evaluate quantitatively the performance of that selection relative to an ideal (equal period) case. The smaller the deviation from the ideal wavefront, the smaller are the aberrations and the larger is the fraction of energy steered to the desired angle. Energy not steered to the desired angle is scattered by the phase aberrations into unwanted sidelobes; the fractional energy in the sidelobes is just unity minus the Strehl ratio.

As an example, consider the case of simulating a phase ramp of five waves phase shift across the aperture of a 48-element subarray. This requires a $2\pi$ phase reset every 9.6 elements, corresponding to ideal periods of 9.6 elements, which is not realizable with a 48-element subarray. However, exactly five waves can be obtained with combinations of three periods of ten electrodes each and two of nine electrodes each. Irrespective of the permutational order in which these periods are arranged, the steering angle remains fixed to first order; namely, the angles for five waves phase shift, which, for the case of the interphase-shifter spacing of one wave, is ±5.98°, shown in FIG. 3 as beam positions 62. However, the amount of energy steered into the desired direction does vary with the period order. The case of periods ordered as [10,10,10,9,9] exhibits a larger maximial phase deviation from the ideal linear phase front than does an ordering of [10,9,10,9,10]. The former ordering concentrates the phase deviations, which is penalized with the rms weighting. The latter ordering generates a wavefront which oscillates about the ideal, thereby accumulating less rms phase error. The calculated Strehl ratios for the two cases are 0.95 and 0.98, respectively. In this example, both orderings would generally be useful; however, the alternated ordering has only one-third the sidelobe energy and is preferred.

In accordance with another technique for driving the subarrays of a subaperture-addressed beam steerer, periods which are not exact integral multiples of the subarray size also may be employed, albeit with degraded beam quality. An example of this technique is a staircase ramp of five steps followed by one step out of place, such as a repeat maximum or minimum step value. The acceptability of such states depends on the amount of beam degradation allowable. This must be considered on a case-by-case basis using the Strehl ratio as a criterion. However, it appears that the use of a 3-bit phase quantization is adequate to maintain sidelobe levels under 20 dB for Gaussian beam illumination, at least for beam steering angles which are not large, typically under 20°. Thus, deviations of the phase ramp from ideal which are as large as 45° may be acceptable.

In conclusion, it is seen that by employing the methods of the present invention many beam steering positions may be obtained with only moderate-sized subarrays. For the discussed case of a subarray having M phase shifters, there are at least M useful states.

While the principles of the present invention have been demonstrated with particular regard to the methods disclosed herein, it will be recognized that various departures from such disclosed methods may be undertaken in the practice of the invention. The scope of this invention is not intended to be limited to the methods disclosed herein but should instead be gauged by the breadth of the claims which follow.

What is claimed is:

1. A method for steering an incident electromagnetic beam using a beam steerer, said beam steerer comprising a multiplicity of phase shifters divided among a plurality of identical, internally connected subarrays, said subarrays being permanently connected and addressed in parallel, said method comprising:
   a. identically subdividing each subarray into a plurality of periods; and
   b. applying voltages to said phase shifters of each subarray such that there results a staircase profile of voltages applied to the phase shifters of each period.

2. The method according to claim 1 wherein each period includes an equal number of phase shifters.

3. The method according to claim 1 wherein each subarray is subdivided into a plurality of periods in which not all of the periods include an equal number of phase shifters.

4. The method according to claim 1 wherein the staircase profile of voltages applied to said phase shifters of each period is selected to provide a phase ramp of $2\pi$ across the period.

5. The method according to claim 1 wherein the staircase profile of voltages applied to said phase shifters comprises a ramp of equal steps and further having one of the steps repeated.

6. A method for steering an optical beam using a subarray-addressed beam steerer, said beam steerer comprising an array of optical phase shifters having a common electrode on a first surface thereof, a multiplicity of S parallel stripe electrodes on a second surface thereof, and an electro-optic phase shifting medium intermediate said first and second surfaces; M interconnects, each interconnect being coupled to S/M of said stripe electrodes, wherein the ith interconnect is coupled to each of the (i+jM)th stripe electrodes for all integer values of j from 0 to (S/M)−1; and means for coupling M control signals individually between said M interconnects and said common electrode, thereby creating local variations of refractive index in said phase shifting medium, said method comprising:

a. identically subdividing each subarray into a plurality of periods; and b. applying voltages to said phase shifters of each subarray such that there results a staircase profile of voltages applied to said phase shifters of each period.

7. The method according to claim 6 wherein each period includes an equal number of phase shifters.

8. The method according to claim 6 wherein each subarray is subdivided into a plurality of periods in which not all of the periods include an equal number of phase shifters.

9. The method according to claim 6 wherein said staircase profile of voltages applied to said phase shifters of each period are selected to provide a phase ramp of $2\pi$ across the period.

10. The method according to claim 6 wherein the staircase profile of voltages applied to said phase shifters comprises a ramp of equal steps and further having one of the steps repeated.

11. A method for providing a beam position for an incident electromagnetic beam using a beam steerer, said beam steerer comprising a multiplicity of phase shifters divided among a plurality of identical, internally connected subarrays, said subarrays being permanently connected and addressed in parallel, said method comprising:

a. identically subdividing each subarray into m periods, said m periods including $N_1, N_2, \ldots, N_m$ phase shifters, where $N_1+N_2+\ldots+N_m$ equals the number of phase shifters in each of said identical subarrays; and b. applying voltages to said phase shifters of each subarray such that there results a staircase profile of voltages applied to said phase shifters of each period, wherein said beam is steered to an off-boresight angle determined by $\Theta=\sin^{-1}[\lambda(1/N_1+1/N_2+\ldots+1/N_m)/m\Lambda_0]$, where $\lambda$ is the freespace wavelength of said beam, and $\Lambda_0$ is the spacing between said phase shifters.

12. The method according to claim 11 wherein each of the m periods includes an equal number of phase shifters.

13. The method according to claim 11 wherein not all of the m periods includes an equal number of phase shifters.

14. The method according to claim 11 wherein the staircase profile of voltages applied to said phase shifters of each period is selected to provide a phase ramp of $2\pi$ across the period.

* * * * *